United States Patent

[11] 3,554,117

[72] Inventor Werner P. Goldkuhle
    Dallas, Tex.
[21] Appl. No. 813,177
[22] Filed Apr. 3, 1969
    Continuation-in-part of Ser. No. 747,900, July 26, 1968.
[45] Patented Jan. 12, 1971
[73] Assignee Concentric Engineering Company
    Dallas, Tex.
    a corporation of Texas

[54] APPARATUS FOR BALING LOOSE MATERIAL
    9 Claims, 8 Drawing Figs.
[52] U.S. Cl. .................................................. 100/43,
    100/100, 100/139, 100/186, 100/189, 100/209,
    100/215, 100/218, 100/269
[51] Int. Cl. ...................................................... B30b 15/26,
    B30b 7/04, B30b 15/30
[50] Field of Search .......................................... 100/43,
    139, 188, 186, 192, 245, 269, 215, 218, 209, 200,
    189, 147

[56] References Cited
    UNITED STATES PATENTS
    380,185   3/1888   Chase ........................... (100/209UX)
    524,771   8/1894   Stokely ......................... 100/186
    845,356   2/1907   Huggins ........................ 100/209
    965,298   7/1910   Herbein ........................ (100/218UX)
    1,290,203 1/1919   Houk ........................... 100/186X
    2,587,997 3/1952   Guettler ....................... 100/186
    3,086,456 4/1963   Englund ........................ 100/192
    3,350,999 11/1967  Morse .......................... 100/43
    FOREIGN PATENTS
    875,441   8/1961   Great Britain ................. 100/43

Primary Examiner—Billy J. Wilhite
Attorney—Marcus L. Bates

ABSTRACT: A refuse baler having a conveyor system, a supercharger, an elongated bale forming tunnel, and two spaced apart bale forming pistons reciprocatingly received therein; with each piston being actuated by a common power means. The bale forming tunnel has a movable wall portion at each extremity thereof which cooperates with the piston and power means to extrude a continuous length of refuse which is of consistent density. A bale breaker separates the extruded refuse into individual bales of uniform length.

３,554,117

APPARATUS FOR BALING LOOSE MATERIAL

CROSS-REFERENCES TO RELATED APPLICATIONS

This application is a continuation-in-part of U.S. Pat. application Ser. No. 747,900, filed Jul. 26, 1968.

BACKGROUND OF THE INVENTION

Reference is made to U.S. Pat. application Ser. No. 747,900 filed July 26, 1968 for the background of this invention.

SUMMARY OF THE INVENTION

The present invention contemplates improved apparatus for baling material, such as refuse, and includes an elongated tunnel within which there is located a power means in the form of a double acting hydraulically actuated piston. The power means reciprocates spaced apart pistons which are slidably received within a piston receiving portion of the tunnel. The tunnel includes a refuse receiving inlet located adjacent to a bale forming portion of the tunnel and a bale delivery outlet at each terminal end thereof. Near the outlet there is provided a movable wall which forms a portion of the tunnel, and which provides a means for applying pressure to the refuse as it is being compressed into a bale. The movable wall includes a pivoted member to which a floating member is journaled in a manner to maintain the bale contacting surface of the floating member always in the horizontal position.

The movable wall member exerts a regulated force upon the bale which is maintained at a value proportional to the force exerted upon the compacting piston so as to attain a bale of predetermined density, regardless of the nature of the refuse undergoing compaction.

It is therefore a primary object of the present invention to provide apparatus for compacting loose material into a continuously extruded bale.

Another object of the invention is to provide apparatus for simultaneously forming to two continuous bales.

Still another object of the present invention is the provision of means by which the density of a bale may be controlled during a baling operation.

A further object of the invention is the provision of a tunnel having spaced apart compaction chambers within which there is located a piston, with each of the pistons being reciprocatingly actuated by a double acting hydraulic cylinder.

A still further object of this invention is the provision of a first stage compaction apparatus which greatly increases the capacity of a second stage baling apparatus.

An additional object of the present invention is the provision of improved apparatus for baling refuse and the like which includes a tunnel having dual compacting chambers associated therewith with each chamber including a movable wall for controlling the density of the bales, and for enabling baled refuse to form a wall of the compacting chamber Other objects of the present invention will become apparent as the remainder of the disclosure is studied in conjunction with the drawings.

The above objects are attained in accordance with the present invention by the provision of baling apparatus fabricated essentially as outlined in the above abstract and summary, as will be further amplified by the detailed description of the invention.

DETAILED DESCRIPTION OF THE PREFERRED EMBODIMENTS

Figure 1:
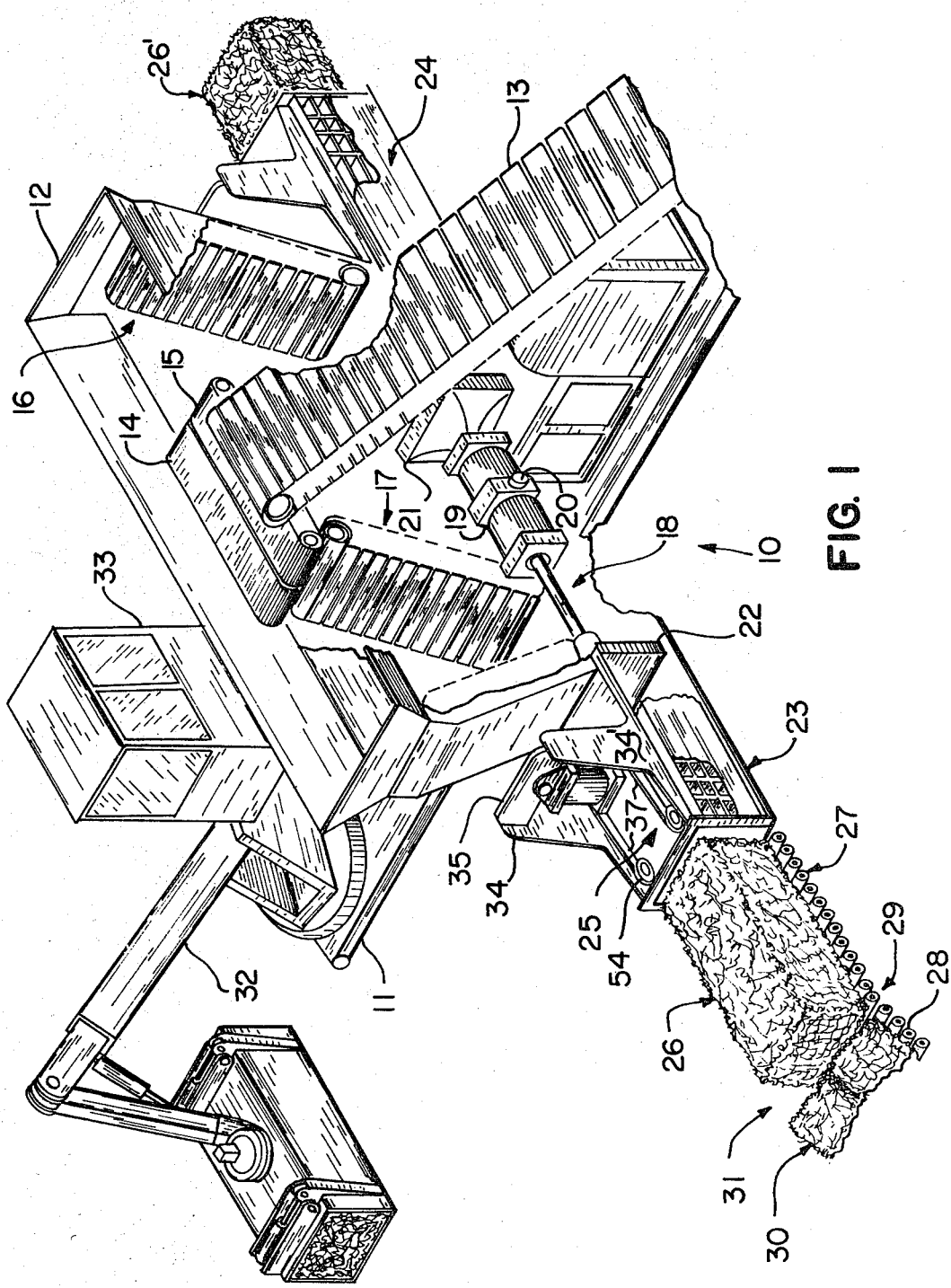
FIG. 1 is a perspective view of apparatus for baling refuse which has been constructed in accordance with the present invention with some parts being broken away therefrom.

FIG. 1 is a perspective view showing one arrangement of the present invention, and which sets forth apparatus 10 for baling loose material such as refuse, with the apparatus preferably being skid mounted for portability as indicated by numeral 11. An upwardly diverging rectangular hopper 12 has an entrance at the upper extremity thereof which underlies a conventional belt type conveyor 13. Two spaced apart oppositely traveling belt type conveyors 14 and 15 are interposed between superchargers 16 and 17 and laterally disposed at and with respect to the delivery end of conveyor 13 so as to laterally transport the refuse into each supercharger.

A tunnel inlet 18 is disposed above and offset from a power means which, for purpose of illustration, is schematically shown in the form of a double acting piston which is hydraulically actuated within cylinder 19. The cylinder is anchored to the sidewalls of the elongated tunnel by means of bracket 20. Compaction pistons 21, 22 are diametrically opposed with respect to each other and are reciprocatingly received within compaction tunnel portions 23 and 24, with each piston being connected to the common double acting piston contained within the hydraulic cylinder 19. The compaction portions or sections of the tunnel are each longitudinally disposed along a common axis with each portion terminating at each extremity of the tunnel in a reinforced webbed arrangement, with the terminal ends of the tunnel providing the illustrated baled refuse outlets. Adjacent to the terminal ends of the tunnel and spaced apart from the compaction piston there is provided means for applying pressure to the material undergoing compaction which is in the form of a movable wall 25. The movable wall forms a portion of the tunnel wall. An endless extruded bale of refuse 26 exits from the tunnel outlet where it is slidably received upon roller conveyor 27. As illustrated in FIG. 1, roller conveyor 28 is inclined with respect to 27 to cause the endless bale to "break-over" at 29, thereby enabling the weight of the bale to break the continuously extruded material into a predetermined size of bale 30 with the breakage occurring along one of the interfaces of adjacent increments, as indicated by the arrow at numeral 31.

A bale handling apparatus is attached to a boom 32 and is controllably actuated from cab 33 in a manner to enable an operator in control of the baling apparatus to conveniently load the individual bales upon a suitable transport (not shown) in the illustrated manner of FIG. 1.

Looking in detail now to the means for applying pressure to the bale, there is seen two spaced apart tunnel sidewall extensions 34,34' to which there is secured a hanger beam 35 for pivotally supporting a hydraulic cylinder and piston arrangement having a shaft depending therefrom for controlling the position of the movable wall. Spaced apart leveling bars 37 are provided with journals at each extremity thereof with one journal being secured to tunnel structure and the other to a floating member of the movable wall. The floating member has a trailing edge 38, an outer surface 39, and an inside bale contacting surface 40. Piston shaft 41 is connected to and moves the pivoted member 42 with the pivoted member being journaled to tunnel structure at 43 so as to controllably present the bale contacting surface 44 to the oncoming compressed refuse which is continuously moved through the tunnel by the compaction piston. The compaction piston includes a skirt 45' which encloses shaft 45 with the trailing end portion of the piston being indicated by numeral 46. The piston reciprocates within the piston receiving portion 47 of the tunnel to thereby define a piston receiving chamber 48. An elongated slot 49 is longitudinally disposed for a limited length along opposite sides of the skirt of the piston so as to enable each slot to slidably receive the before mentioned mounting bracket of the power means therewithin. The arrow at numeral 50 indicates a schematical representation of a second movable wall portion located at the opposite end of the tunnel, and since each of the bale forming apparatuses are identical in construction, a detailed description thereof is unnecessary.

Figure 4:
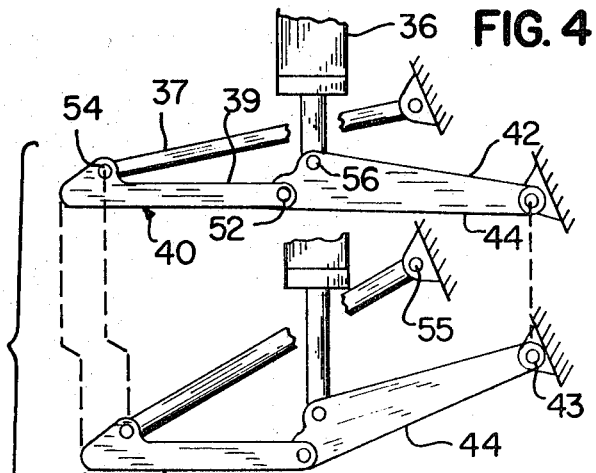
FIG. 4 is an illustration of the operation of a portion of the apparatus shown in FIGS. 1 and 2.
Figure 5:
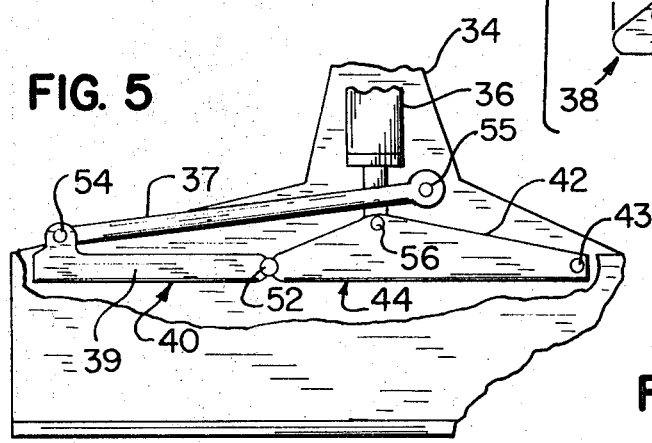
FIG. 5 is a partial side view of some of the apparatus seen in FIG. 2, with some parts thereof being broken away in order to better illustrate the invention.
Figure 6:
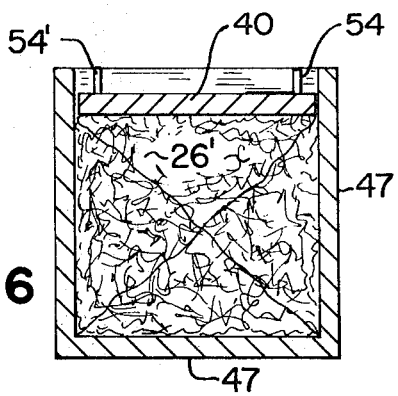
FIG. 6 is a cross-sectional view taken along line 6–6 of FIG. 2.

Looking in detail to FIGS. 4, 5, and 6, it will be noted that the floating member is journaled to the pivoted member at 52, with each of the members cooperating together to form the before mentioned movable wall member. The before mentioned spaced apart leveling bars each have one end thereof affixed to the trailing end of the floating member by means of the journal 54, with the remaining end of the bar being journaled to tunnel structure at 55, as for example, to the sidewall extension 34. The hydraulic cylinder 36 has the free end of the piston rod thereof journaled to the pivoted member at 56, which is also intermediate journals 52 and 55. The cylinder is pivotally anchored by pin 57 to the before mentioned hanger beam.

Figure 7:
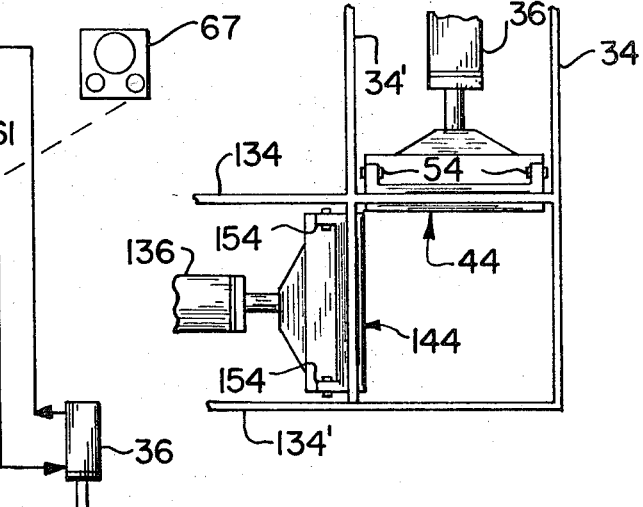
FIG. 7 is a partial end view of apparatus which sets forth a modification of FIG. 2.

As seen in the embodiment of FIG. 7, adjacent walls of the tunnel are provided with extensions 34, 34' and 134, 134' for the purpose of supporting hydraulic cylinders 36, 136 which in turn actuate movable wall portion 44, 144 with each of the movable wall portions cooperating with the hydraulic cylinder in the same manner previously described in conjunction with the foregoing FIGS.

Figure 8:
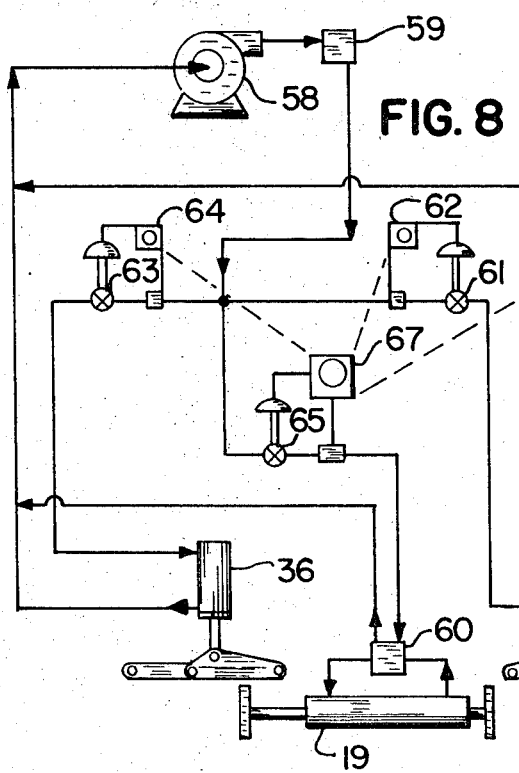
FIG. 8 is a schematical representation in the form of a flow sheet which sets forth hydraulic control circuitry for use in conjunction with the apparatus disclosed in FIGS. 1 and 2.

As seen in FIG. 8, a hydraulic pump 58 is flow connected to a reservoir 59 which in turn is flow connected to a reversing valve system 60 so as to alternately connect each of the cylinder heads of power means 19 to a source of fluid pressure and to a fluid return; the details of such a valve being within the comprehension of those skilled in the art. Flow control valves 61, 63, and 65 control the flow of fluid to the hydraulic cylinder of the spaced apart movable wall members and to the power means of the compacting pistons, Indicating flow transmitters 62, 64, and 66 send a signal to the ratio flow controller 67 which in turn maintains a pressure within the movable wall cylinder which is proportional to the pressure within the power means.

OPERATION

In operation, loose material, such as refuse which has previously been shredded, is dumped upon the lower end of conveyor 13 and conveyed above the hopper where it drops onto both the lateral conveyors 14 and 15. Normally the lateral conveyors travel in opposite directions, however, when deemed desirable, the direction of travel of either conveyor can be reversed so as to accelerate the feed rate into either of the superchargers.

The downwardly converging material engaging portions of the superchargers compact the refuse as it is transported towards inlet 18 or 18', thereby effecting a first compaction of the refuse. Assuming the compaction pistons to be arranged in the illustrated manner of FIG. 2, refuse will be forced through inlet 18' where it fills the void within the tunnel which is occupied by the piston on the compression stroke, that is, the space between the face of the piston 21 and the last formed increment of baled refuse 26". After a suitable time delay which enables the void to be packed with refuse, the power cylinder forces piston 21 towards the tunnel outlet, thereby compacting the loose refuse contained therein into another increment of refuse. This action causes piston 22 to clear inlet 18, and the loose refuse which has accumulated at the lower extremity of the supercharger 17 now flows thru through the inlet and into the newly created void located between piston 22 and the last increment of baled refuse which was formed during the previous cycle. The compaction operation continues in this cyclic manner with an endless bale of refuse being formed which is comprised of the illustrated increments which accumulate within the tunnel, with each stroke of each of the pistons forcing a portion of the endless bale from the outlet.

As the baled refuse is forced through the tunnel, it contacts the face of the downwardly sloped pivoted member 44, causing a back pressure to be developed which presents a resisting force proportional to the force exerted by the compacting piston. This back pressure enables the last increment of the formed bale to be utilized as a movable bulkhead against which the compaction piston compresses each new charge of refuse into another increment of the bale. In FIG. 4, both the retracted position and the extended position of the movable wall are shown. Since the journals 52, 54 are anchored to tunnel structure, the arm 37 causes the face of the floating member to remain parallel to the longitudinal axis of the tunnel while the bale contacting face 44 of the pivoted member will be inclined an amount necessary to reduce the tunnel opening to a value which produces the required back pressure to develop a bale of the desired density.

Where deemed desirable, the tunnel can be fabricated in accordance with FIG. 7, wherein adjacent sides of the tunnel are each provided with the movable wall member seen in FIG. 5, which enables separate hydraulically actuated cylinders 36, 136 each to exert a force against an opposite fixed wall thereby developing additional back pressure in order to achieve a bale having a greater density as compared to a tunnel having a single movable wall member associated therewith.

Figure 2:
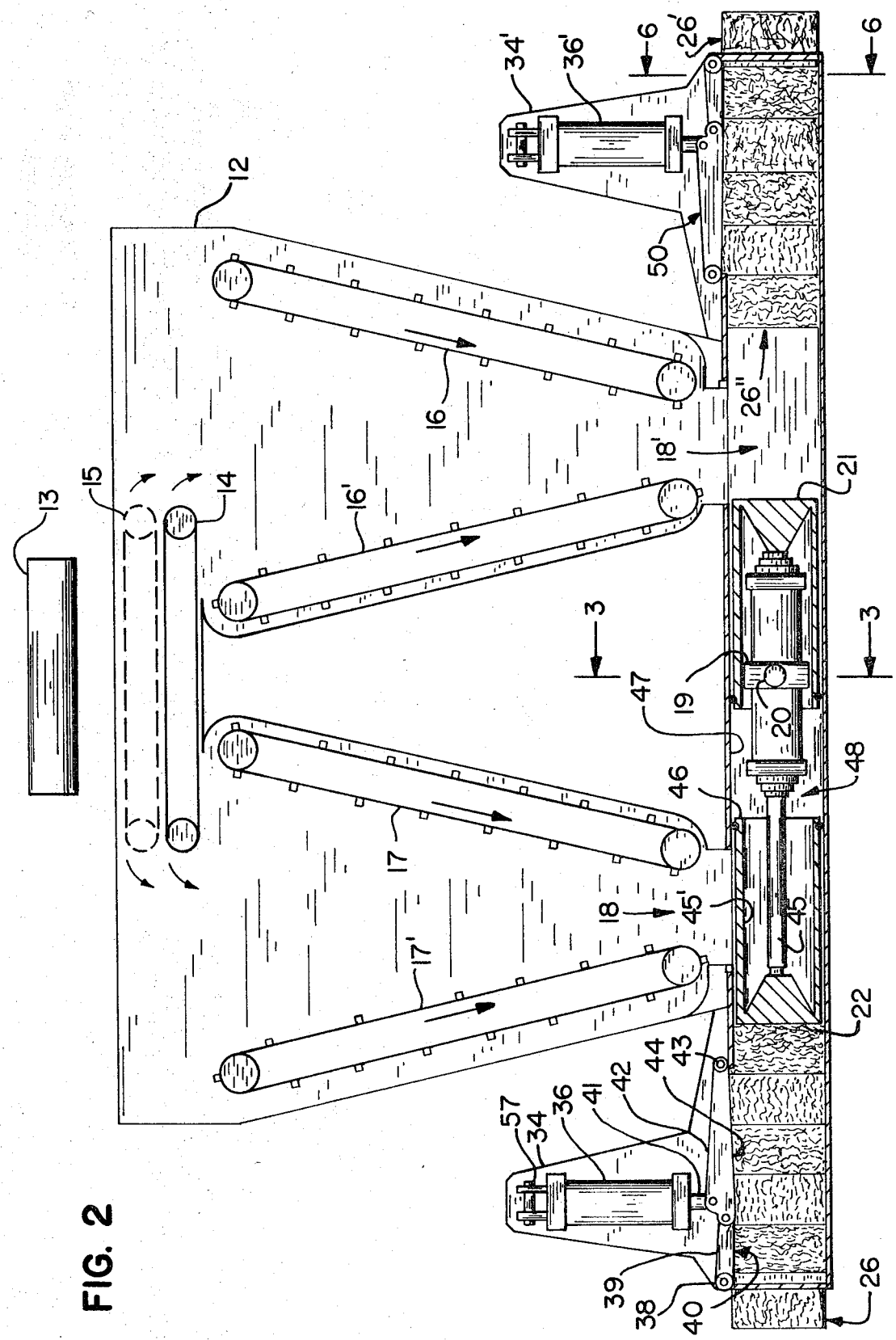
FIG. 2 is a vertical cross-sectional view taken longitudinally through the tunnel of FIG. 1, with some additional parts being shown, while other parts thereof are not shown in cross section for simplicity.
Figure 3:
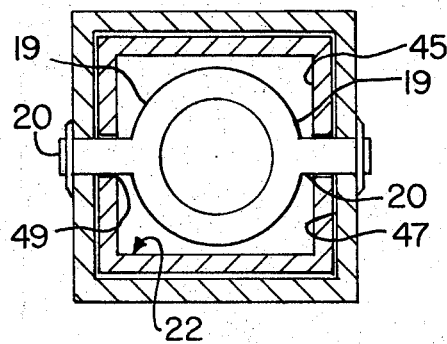
FIG. 3 is a cross-sectional view taken along line 3–3 of FIG. 2, with some of the parts thereof being diagrammatically disclosed.

As seen in the flow sheet of FIG. 8, two movable wall members, one disposed at either extremity of the tunnel as in FIG. 2, each receive a source of fluid pressure through a valve means 61, 63. The valve means are preferably flow controlled motor valves having an indicating flow transmitter 62, 64 attached thereto for relaying the pressure in the flow conduit to a ratio flow controller 67. The ratio flow controller maintains the pressure which the hydraulic cylinder 36 exerts against the wall at a value which is proportional to the fluid pressure which moves the power piston 19. This expedient enables considerably latitude in the physical properties of the shredded refuse which is fed into the supercharger. As the physical characteristics of the refuse changes, the movable wall will continuously change position, or "breathe", as it moves somewhere inbetween the illustrated position of FIGS. 4a and 4b to thereby maintain a bale of constant and predetermined density.

As the continuous rectangle of refuse emerges from the outlet, it is broken into individual bales of a convenient size by the action of the roller conveyor arrangement 27, 28 which causes the continuous bale to separate along a smooth interface formed between adjacent increments of refuse so as to provide bales of a predetermined length.

The provision of a double acting power cylinder having a common shaft to which there is attached compacting pistons in the manner of FIG. 2 enables a refuse baling apparatus to be fabricated with a considerable reduction in cost. The supercharger together with the movable wall member and the bale forming roller conveyor provides a means by which refuse can be rapidly and efficiently baled, transported to a suitable disposal site, such as the land fill method of garbage disposal, to thereby effect a substantial savings in transportation, earth moving costs, as well as providing an improved and more sanitary bale of refuse.

As will be evident to those skilled in the art, a refuse baler can also be fabricated by using a single supercharger for effecting a first stage compaction of the material to be baled. A single baling tunnel associated with a movable wall, such as seen in either FIGS. 5 or 7, can be fabricated in accordance with the teachings of this invention. It will further occur to those skilled in the art to utilize the movable wall of FIG. 5 in conjunction with balers of various other designs.

I claim: cm 1. Apparatus for baling refuse including:
a tunnel having a longitudinal axis and including a refuse inlet and a baled refuse outlet;
a compaction piston mounted within the tunnel;
power means for reciprocating the piston relative to the tunnel and for thereby forcing refuse from the inlet of the tunnel toward the outlet thereof; and
a movable wall portion positioned between the inlet and the outlet of the tunnel and comprising:
  a. a pivoted member journaled to the tunnel;
  b. a floating member journaled to the pivoted member and having a refuse contacting face;
  c. means for moving the pivoted member to control the cross-sectional area of the tunnel; and
  d. means for maintaining the refuse contacting face of the floating member parallel to the longitudinal axis of the tunnel.

2. The apparatus for baling refuse according to claim 1 further including means for exerting a force on the movable wall member that is proportional to the force exerted on the compaction piston by the power means.

3. The apparatus for baling refuse according to claim 1 further including a pair of converging conveyors positioned adjacent the inlet of the tunnel for receiving refuse, for precompressing the refuse, and for forcing the refuse into the inlet of the tunnel.

4. The apparatus for baling refuse according to claim 1 wherein;
the tunnel includes a second refuse inlet and a second baled refuse outlet;
a second compaction piston is mounted within the tunnel; and
the power means reciprocates the second piston within the tunnel and thereby forces refuse from the second inlet toward the second outlet; and
further including a second movable wall member positioned between the second inlet and the second outlet of the tunnel and constructed substantially identically to the first movable wall member.

5. The apparatus of claim 1, and further including a first and second series arranged conveyors located adjacent to said baled refuse outlet for receiving and transporting baled refuse thereon; said first and second conveyors being arranged at an angle with respect to each other; whereby the weight of the baled refuse causes the baled refuse to be broken into individual bales after the refuse leaves the tunnel outlet.

6. Apparatus for baling refuse including:
a tunnel having a longitudinal axis and including a refuse inlet and a baled refused outlet;
a compaction piston mounted within the tunnel;
power means for reciprocating the piston relative to the tunnel and for thereby forcing refuse from the inlet of the tunnel toward the outlet thereof;
a pair of pivotal members each journaled to the tunnel at a point between the inlet and the outlet and mounted for movement in mutually perpendicular directions; and
a pair of hydraulic cylinders, one for moving one of the pivotal members toward and away from the longitudinal axis of the tunnel and the other for moving the other pivoted member toward and away from the longitudinal axis of the tunnel.

7. The apparatus for baling refuse according to claim 6 further including a pair of conveyors positioned at the baled refuse outlet of the tunnel, one of the conveyors extending parallel to the longitudinal axis of the tunnel and the other extending downwardly with respect thereto, whereby the weight of the baled refuse leaving the tunnel causes the refuse to break into individual bales.

8. The apparatus for baling refuse according to claim 6 further including a pair of downwardly and inwardly converging conveyors positioned adjacent the inlet of the tunnel for receiving and for precompressing the refuse before it enters the tunnel.

9. The apparatus for baling refuse according to claim 6 wherein:
the tunnel includes a second refuse inlet and a second baled refuse outlet;
a second compaction piston is mounted within the tunnel; and
the power means reciprocates the second piston within the tunnel and thereby forces refuse from the second inlet toward the second outlet;
further including a second pair of pivotal members each journaled to the tunnel at a point located between the second inlet and the second outlet; and
a second pair of hydraulic cylinders each for moving one of the pivoted members toward and away from the longitudinal axis of the tunnel.